United States Patent [19]

Fero et al.

[11] Patent Number: 4,876,058

[45] Date of Patent: Oct. 24, 1989

[54] NUCLEAR POWER GENERATING STATION EQUIPMENT QUALIFICATION METHOD AND APPARATUS

[75] Inventors: Arnold H. Fero, New Kensington; Lawrence M. Potochnik, Washington Township, Westmoreland County; Ronald W. Riling, Penn Hills; Kenneth F. Semethy, North Versailles Township, Allegheny County, all of Pa.

[73] Assignee: Westinghouse Electric Corp., Pittsburgh, Pa.

[21] Appl. No.: 104,733

[22] Filed: Oct. 5, 1987

[51] Int. Cl.$^4$ .............................................. G21C 17/00
[52] U.S. Cl. .................................. 376/247; 376/245; 376/249
[58] Field of Search ............... 376/245, 247, 249, 254; 73/86; 324/71.2; 340/600, 584; 250/390 B, 392

[56] References Cited

U.S. PATENT DOCUMENTS

| | | | |
|---|---|---|---|
| 3,089,958 | 5/1963 | Janner | 250/83.1 |
| 3,622,274 | 11/1971 | Richardson et al. | 73/86 |
| 3,638,018 | 1/1972 | Gasper | 376/254 |
| 3,772,918 | 11/1973 | Bowles | 73/86 |
| 3,809,940 | 5/1974 | Sekella | 313/61 R |
| 3,846,795 | 11/1974 | Jones | 340/421 |
| 3,898,467 | 8/1975 | Schukei et al. | 376/245 |
| 3,971,944 | 7/1976 | Quinby | 250/391 |
| 4,069,097 | 1/1978 | Frank | |
| 4,079,236 | 3/1978 | Graham et al. | 364/504 |
| 4,097,330 | 6/1978 | Neissel et al. | |
| 4,157,277 | 6/1979 | Marmonier et al. | |
| 4,167,109 | 9/1979 | Gold | 73/15 R |
| 4,186,048 | 1/1980 | Thomas | |
| 4,200,491 | 4/1980 | Ball | |
| 4,288,291 | 9/1981 | Cisco et al. | |
| 4,318,776 | 3/1982 | Proll et al. | 376/254 |
| 4,320,393 | 3/1982 | Engdahl | 340/600 |
| 4,379,118 | 4/1983 | Roche | 376/254 |
| 4,404,164 | 9/1983 | Kopp et al. | 376/154 |
| 4,408,904 | 10/1983 | Tokarz | 376/247 |
| 4,504,437 | 3/1985 | Underwood et al. | 376/153 |
| 4,591,996 | 5/1986 | Vachon | 376/245 |
| 4,622,200 | 11/1986 | Gold et al. | 376/245 |
| 4,640,233 | 2/1987 | Draper et al. | 376/245 |
| 4,764,882 | 8/1988 | Braschel et al. | 376/249 |

FOREIGN PATENT DOCUMENTS

| | | | |
|---|---|---|---|
| 612001 | 1/1961 | Canada | 376/265 |
| 3221625 | 4/1983 | Fed. Rep. of Germany | 376/249 |
| 54-103990 | 8/1979 | Japan | |
| 59-102193 | 6/1982 | Japan | |
| 59-203997 | 6/1983 | Japan | |
| 51-15798 | 7/1984 | Japan | |
| 2277599 | 12/1987 | Japan | 376/245 |

OTHER PUBLICATIONS

"On-Line Monitoring and Diagnostics", Streicher et al., NEI, 3/88.
IEEE Std 323-1974, "IEEE Standard for Qualifying Class IE Equipment for Nuclear Power Generating Stations," 2/28/74.
IEEE Std 344-1975 (Revision of IEEE Std 344-1971), "IEEE Recommended Practices for Seismic Qualification of Class IE Equipment for Nuclear Power Generating Stations," 1/31/75.

(List continued on next page.)

Primary Examiner—Harvey E. Behrend
Assistant Examiner—Daniel Wasil

[57] ABSTRACT

Apparatus for monitoring an object piece of qualified equipment in a nuclear power plant includes passive means for detecting a total integrated dose of radiation received by the object piece, means for determining a thermal history of the object piece, and means for housing the passive detection means and determining means in close proximity to the object piece. In order to generate and maintain evidence to assure that qualified equipment used in such stations will operate on demand, the passive detection means and determining means mounted in close proximity to the object piece are exposed to the environment of a normally operating power plant and periodically analyzed to determine whether the qualified life of the object piece may be extended.

26 Claims, 3 Drawing Sheets

OTHER PUBLICATIONS

WCAP-8587 "Methodology" Revision 6-A (NP), Methodology for Qualifying Westinghouse WRD Supplied NSSS Safety Related Electrical Equipment, Mar. 1983.

McLaughlin et al, "Electron and Gamma-Ray Dosimetry Using Radiation—Induced Color Centers in Li F," Technical Paper presented at Second International Meeting on Radiation Processing, Miami, Florida, Oct. 1978.

Vaughn et al, "Dosimetry Using Optical Density Changes in Li F," Health Physics, vol. 18, (1970), pp. 578–579.

Baeyens et al, "Investigations of the Use of LiF Crystals for Routine High-Level Dosimetry at CERN," IAEA-SM-272/11, pp. 275–283.

NUCLEAR POWER GENERATING STATION EQUIPMENT QUALIFICATION METHOD AND APPARATUS

BACKGROUND OF THE INVENTION

This invention relates generally to nuclear power generating stations, and more particularly to a method and apparatus for the generation and maintenance of evidence to assure that qualified equipment used in such stations will operate on demand, to meet the system performance requirements.

Safety system equipment in nuclear power generating stations is required to be capable of performing satisfactorily under defined conditions, including postulated design basis events such as a loss of coolant accident. It is necessary to provide assurance that such equipment meets its performance requirement throughout its installed life. This is accomplished through a disciplined program of design, qualification, production quality control, installation, maintenance, and surveillance testing.

The process of qualification usually also establishes the qualified lifetime of the equipment. That is the period of time, prior to the start of a design basis event, for which the equipment is demonstrated to meet the design requirements for the specified service conditions. At the end of qualified lifetime, such equipment should be capable of performing the safety functions required for the postulated design basis, and post-design basis events. The qualified lifetime of equipment may be extended if it can be shown that the service or environment conditions originally assumed were overly conservative with respect to those that apply at the equipment's location in its installed configuration. Use of extension methods requires documentation of the program to be followed and auditable records of the results, as illustrated in the IEEE Std 323-1974, "IEEE Standard for Qualifying Class IE Equipment for Nuclear Power Generating Stations", which is incorporated herein by reference.

Gamma ray and beta radiation exposure occurring during normal nuclear power plant operations, or occurring as a result of an accident, can alter the performance of certain equipment such as motors, valve and motor operators, transmitters, indicators, instruments, organic fluids, seals, and electrical insulation. For this reason, equipment qualification includes appropriate exposure to radiation as part of the test procedure. The total radiation dose to which the equipment is exposed in qualification testing depends upon the expected normal radiation environment and the length of time following an accident that the equipment is required to operate.

Nuclear power plant personnel will require a knowledge of the total integrated dose of radiation that a piece of equipment has received if it is desired to extend the equipment qualification beyond the present qualified life, or if it is desired to requalify equipment following an accident. As is known, the term "total integrated dose of radiation" refers to an accumulated amount of each type of radiation which is received by the equipment over a period of time, and which is a combination of normal and accident doses. Depending upon the particular form of accident which occurs and the operational conditions of the plant, such normal and accident doses will include not only gamma and beta radiation, but also other forms of radiation such as neutron, electron, X-ray, etc. In general, the radiation doses used for equipment qualification are sufficiently conservative that, if the actual integrated doses are known, the equipment could continue in service without exceeding the existing qualification envelopes. This is particularly true for an accident where the distribution of radiation levels in the nuclear power plant will vary widely, and be much lower than that assumed for qualification, due to radioactive decay during the release, the physical distribution of radioactive material, and the presence of local shielding in the form of structure, other equipment, floors, and walls.

Previously, nuclear power plant personnel would have very few options with regard to thermal and radiation aging of important equipment. Qualified equipment could be replaced when it reached the end of its qualified lifetime in calendar years without regard to the actual environmental aging; or, nuclear power plant life extension decisions and decisions regarding qualified equipment could be made based upon a projection of very limited active temperature and radiation level measurements. Without measured data, the affected equipment could either be replaced, refurbished, or disassembled, inspected, and reassembled. Major problems with such approaches, however, exist in the time and cost for replacement or refurbishment, as well as considerations affecting qualified equipment vendors and qualified repair parts. Therefore, what is needed is a passive system that provides integrated radiation dose and thermal history throughout normal plant operation, through the duration of a nuclear power plant accident, and beyond.

SUMMARY OF THE INVENTION

Accordingly, it is a general object of the present invention to provide a method and apparatus for monitoring qualified equipment installed in a nuclear power plant. More specifically, it is an object of the present invention to provide a passive system capable of indicating total integrated dose and thermal history of an object piece of qualified equipment throughout normal nuclear power plant operation, through the duration of a nuclear power plant accident, and beyond.

Another object of the present invention is to provide data to support continued use of qualified equipment following an accident.

Still another object of the present invention is to provide data to support nuclear power plant life/license extension applications.

A further object of the present invention is to provide data to support the proposition that an object piece of qualified equipment has not yet reached the end of its qualified life.

Still a further object of the present invention is to provide data to help avoid potential common cause replacement of aged qualified equipment.

It is yet another object of the present invention to provide data to correlate actual aging observations in equipment.

A further yet object of the present invention is to demonstrate utility management prudence with regard to an integrated equipment surveillance program, pre-planning for nuclear power plant lifetime/license extension (PLEX), and a commitment to post-accident nuclear power plant recovery.

Briefly, these and other objects of the present invention are accomplished by apparatus for monitoring an object piece of qualified equipment in a nuclear power plant which includes passive means for detecting a total integrated dose of radiation received by the object piece, means for determining a thermal history of the object piece, and means for housing the passive detection means and means for determining said thermal history in close proximity to the object piece.

The passive detection means, in accordance with one embodiment of the present invention, includes first dosimetry means for measuring a gamma ray dose, and second dosimetry means for measuring a beta ray dose. In accordance with that same embodiment, the means for determining said thermal history includes first monitor means for determining a peak temperature experienced by the object piece, and second monitor means for determining an integrated thermal exposure to the object piece.

A method of monitoring the object piece which utilizes apparatus in accordance with the first embodiment includes the steps of mounting such passive detection means and means for determining said thermal history in close proximity to the object piece, exposing such mounted means to the environment in a normally operating nuclear power plant, and periodically analyzing the first and second dosimetry means and first and second monitor means to determine whether the qualified life of the object piece may be extended.

In accordance with a second embodiment of the present invention, the passive detection means and means for determining said thermal history are accomplished through a miniature or representative sample of the object piece, preaged to a number of years, which can be tested periodically for those properties important to the survival of the object piece with respect to its age. Such miniaturized or representative sample of the object piece is preaged through exposure to a controlled dose of radiation corresponding to the normal radiation experienced in a nuclear power plant over a predetermined period of time and the radiation experienced during a preselected accident. Such preaging also includes exposure of the miniaturized or representative sample to a thermal profile corresponding to a predetermined service temperature.

In accordance with this second embodiment, a method of monitoring the object piece includes the performance of baseline tests prior to the installation of the miniaturized or representative sample in the nuclear power plant, exposing the sample to the environment of the normally operating nuclear power plant, and periodically repeating the baseline tests to determine whether the qualified life of the object piece may be extended by comparing that qualified life to the installed life plus the number of years corresponding to the preaged life of the sample.

The above and other objects, advantages, and novel features of the present invention will become more apparent from the following detailed description of the invention when considered in conjunction with the accompanying drawings wherein:

DETAILED DESCRIPTION OF THE INVENTION

Figure 1:
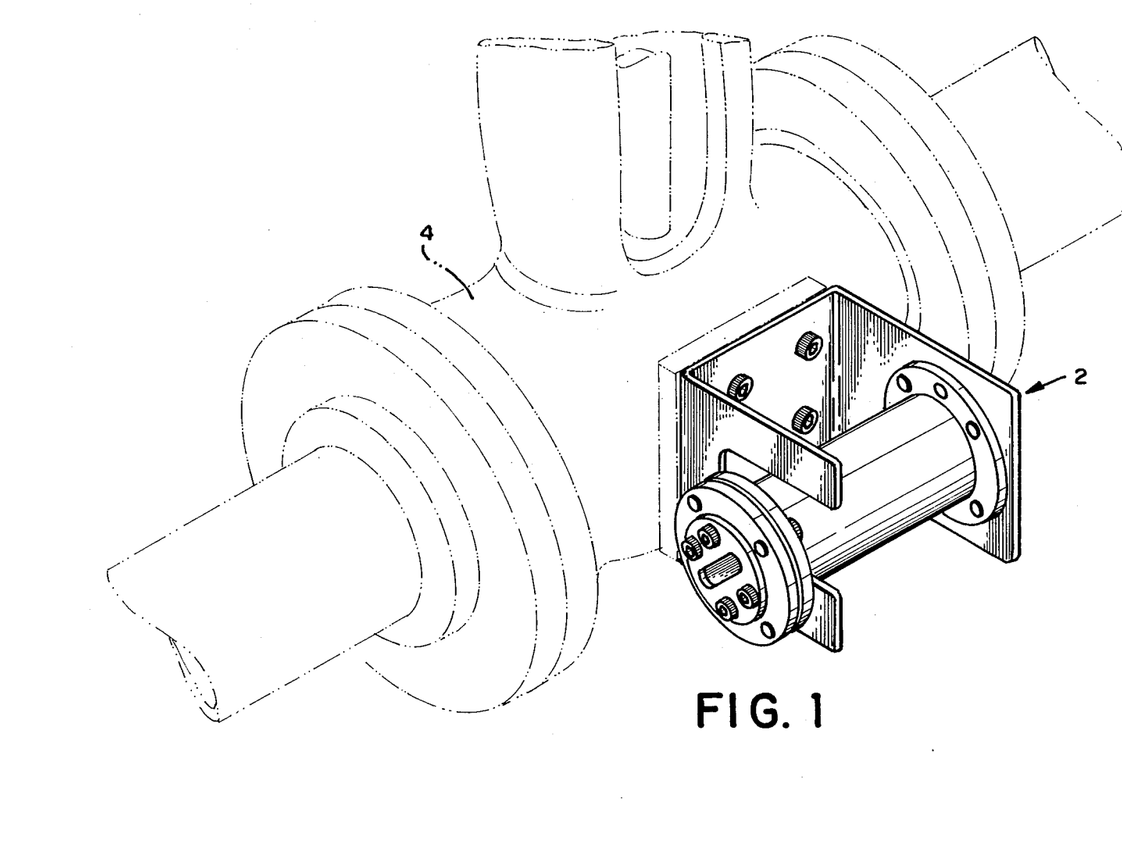
FIG. 1 illustrates a first embodiment of the monitor according to the present invention.

Referring now to the drawings, wherein like characters designate like or corresponding parts throughout the several views, there is shown in FIG. 1 a first embodiment of a monitor 2 attached to the side of a motor-operated valve 4, such as an in-containment gate valve of a nuclear power plant. The valve 4 may be considered for purposes of the present application to be safety-related, and conventionally includes a motor operator (not shown) which is qualified in accordance with WCAP-8587, Revision 6-A (NP), entitled "Methodology for Qualifying Westinghouse WRD Supplied NSSS Safety-Related Electrical Equipment", approved by the Nuclear Regulatory Commission on Nov. 10, 1983, available to the public from Westinghouse Electric Corporation, Power Systems, Box 355, Pittsburgh, Pa. 15230, and incorporated herein by reference. It should be noted at this juncture that the monitor 2 may alternatively be mounted to the motor operator (not shown) instead of the valve so long as the monitor 2 is in close proximity to the object piece of qualified equipment, in this case 4 the valve.

Figures 2, 3:
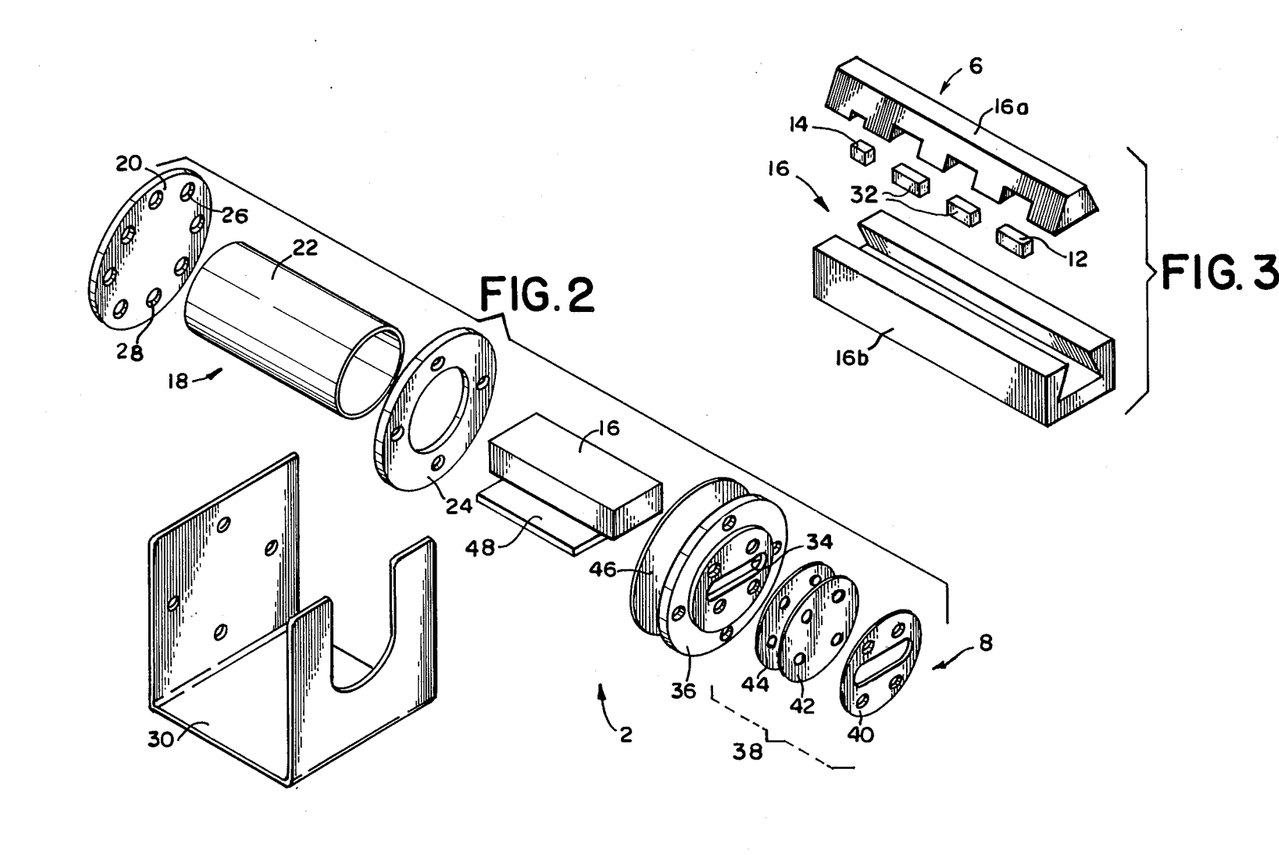
FIG. 2 is an exploded view of the monitor shown in FIG. 1.
FIG. 3 illustrates one means of holding dosimeters utilized in accordance with the present invention.

As shown in greater detail in FIGS. 2 and 3, when considered in conjunction with FIG. 1, the monitor 2 is generally comprised of first dosimetry means 6 for measuring a gamma ray dose and second dosimetry means 8 for measuring a beta ray dose, the first and second dosimetry means 6,8 together comprise a passive means 10 for detecting a total integrated dose of radiation received by the object piece or valve 4. The first dosimetry means 6 includes color-center formation means 12 for measuring the gamma ray dose in a range of from approximately $10^3$ rads to $10^{10}$ rads, thermoluminescent dosimetry means 14 for measuring the gamma ray dose in a range of from 10 rads to approximately $10^5$ rads, and means 16 for holding the color-center formation means 12 and the thermoluminescent dosimetry means 14 within a holder body 18 including an end plate portion 20, a tubular portion 22, and a flange portion 24. The end plate portion 20 includes a plurality of through holes 26 and tapped holes 28 through which the holder body 18 may be attached to a support stand 30. The support stand 30 is also configured so as to be adapted for mounting directly to an object piece of equipment, such as is shown in FIG. 1, or stand freely in close proximity to the object piece.

The color-center formation means 12 comprises in a presently preferred embodiment a plurality of conventional lithium fluoride (LiF) optical crystals 32. As is well known, ionizing radiation produces relatively stable color-centers in lithium fluoride. The values of the optical absorbance of the maxima of the resulting absorption bands are measured at a plurality of discrete wavelengths. The principle of color-center formation as a radiation dosimeter involves exposure to ionizing radiation which results in trapped electrons in negative ion vacancies in the lattice. These trapped electrons are responsible for the optical absorbance phenomenon known as "color-centers". As is well known, a series of color-centers are developed in lithium fluoride with increasing radiation dose. See, for example, "Electron and Gamma-Ray Dosimetry Using Radiation-Induced Color Centers in LiF", McLaughlin, a technical paper presented at the Second International Meeting on Radiation Processing, Miami, Fla. 1978. By utilizing absorption bands corresponding to different types of color-centers, an absorbed dose range from $10^3$ to $10^{10}$ rads can be covered, with response regions overlapping at the doses of change-over from one to the other center. The production of each type of color-center is initially proportional to absorbed dose, and then gradually tends towards saturation. Each of th LiF optical crystals is read by measuring the amount of optical absorbance at wavelengths which correspond to the various color-centers of interest. This measurement may be made using any commercially available UV-Vis spectrophotometer, with one suitable such spectrophotometer being made by Varian Instrument Division, Sunnyville, Calif. as the model TMS 200. The amount of optical absorbance determined by the spectrophotometer is then compared to a calibration curve to determine the absorbed dose. It should be noted at this juncture that such reading of the LiF optical crystals 32 does not alter the color-centers themselves. Therefore, each dosimeter 32 constitutes a rereadable permanent record. A presently preferred form for the lithium fluoride dosimeter is as a cleaved lithium fluoride crystal, approximately 6 millimeters by 6 millimeters by 2 millimeters in size, which are commercially available from the Harshaw Chemical Company, Solon, Ohio. A permanent identification number is enclosed on one of the 2 millimeters by 6 millimeters edges of each crystal 32 to ensure traceability.

The thermoluminescent dosimetry means 14 comprises in a presently preferred embodiment at least one conventional manganese activated calcium fluoride thermoluminescent dosimeter capable of providing gamma-ray dose information below approximately $10^5$ rads. When the object piece of equipment being monitored is also exposed to a neutron flux during reactor operation, the monitor 2 preferably includes a plurality of solid state track recorders (SSTR). Such SSTRs (not shown) consist of reusable deposits of fissionable material on high purity nickel backing disks in surface contact with replaceable mica. As is known, neutron-induced fission in isotopes of uranium, plutonium, and neptunium produces latent fission-fragment tracks in the SSTR. Such tracks are developed by chemical etching to a size that is observable with an optical microscope for track counting. Both bare and cadmium-shielded isotopes of U-235 and Pu-239 may be used, as well as cadmium-shielded U-238 and Np-239.

In order to provide high-temperature/high-integrated radiation dose resistant positioning for the optical crystals 32 and TLD 14 for long term post-accident use, the holding means 16 is generally comprised of interlocking pieces 16a and 16b formed from a polyimide resin, such as Vespel SP-1 manufactured by Dupont, or a polyetheretherketone thermoplastic such as Arlon 1000, manufactured by Greene, Tweed Engineered Plastics, Harleysville, Pa. The holding means 16 also functions to establish electron equilibrium conditions which satisfy Bragg-Gray small cavity theory requirements. It should be noted at this juncture that while the holding means 16 comprised of the interlocking elements 16a and 16b are shown as a dove tail arrangement, any conveniently manufactured interlocking arrangement which is capable of holding the optical crystals 12 and TLD 14, which satisfies Bragg-Gray small cavity theory electron equilibrium requirements, and which provides high-temperature/high-integrated radiation dose resistance is acceptable in accordance with the teachings herein.

The second dosimetry means 8, in accordance with the present invention, is also comprised of LiF optical crystals 32, preferably two, contained in a slot 34 of a holder cover 36. Mechanical and environmental protection of the crystals 32 (not shown in FIG. 2 for clarity) is provided by beta window means 38 consisting generally of a beta window retainer plate 40, a stainless steel beta window 42, and a beta window seal 44, preferably made of DuPont Kapton Type H polyimide film. In order to result in minimal beta attenuation, the stainless steel beta window 42 and beta window seal 44 should together comprise a mass thickness of less than 30 milligrams per square centimeter. A body seal 46, preferably comprised of the aforementioned Arlon 1000 polyetheretherketone is inserted between the flange portion 24 and holder cover 36 to provide the necessary environmental sealing of the body cavity. Each of the components of the monitor 2 are conveniently assembled with socket head cap screws and lock washers (not shown), although any suitable means of attachment may be used. For example, the holder body 18 could incorporate integrally formed mounting feet in order to be placed directly upon a flat area, or some means of attachment such as stainless steel cable could be passed through the unthreaded through holes 26 in the end plate portion 20 such that the monitor 2 could be hung from the object piece of equipment. In any case, it should be readily apparent that the shielding arrangements provided by the monitor 2 provide sufficient beta attenuation such that only the LiF optical crystals 32 contained within the slot 34 would be exposed to beta and gamma radiation. The optical crystals comprising the color-center formation means 12, on the other hand, would be exposed only to gamma-rays.

Also contained within the holder body 18 is a means 48 for determining a thermal history of the object piece of equipment. The projection means 48 for determining said thermal history, in accordance with the present invention, is typically provided by two means: (1) conventional thermal monitors which irreversibly turn black when the indicated peak temperature is reached, such as Omegalabel TM temperature labels manufactured by Omega Engineering, Incorporated, Stamford, Conn.; and (2) integrating thermal monitors comprised of solid state track recorders adapted for use as integrating thermal monitors. As is well known, solid state track recorders which have been exposed to a fission source contain a known number of fission fragment tracks. These tracks are damaged areas that can be chemical etched to an observable size for optical or spark counting. Such damaged zones are self-repairing by annealing upon exposure of the solid state track recorder to elevated temperatures. The rate and amount of repair is a function of the material and the time at temperature and may be characterized by an Arrhenius function of temperature. One such process for measuring temperature with solid state track recorders is disclosed in U.S. Pat. No. 4,167,109, issued Sept. 11, 1979 to Gold.

According to Gold, mica or quartz track detectors may be used to measure temperature by first exposing the track detector to a known number of fission fragments, placing the track detector in an unknown temperature environment for a length of time T, and measuring the track dimetral change or change in number of tracks observed. As is known, the loss in tracks is a function of temperature and time of exposure. Since the temperature dependency is quite short, in general all tracks will be removed or amended within a very short time if T is greater than $T_0$, and none will be removed if T is less than $T_0 - \Delta T$. Only in the region between $T_0 - \Delta T$ and $T_0$ will fairly precise definition of exposure temperature occur. The temperature $T_0$ for typical track detector materials has only a few values which do not necessarily correspond to temperature in a desired measurement range for applications with the monitor 2.

Since $T_0$ in general related is closely to the melting point of the track detector, use of various plastic and glass types with different melting points will provide a range of temperatures to satisfy almost any need. Once a specific type of plastic or glass is calibrated, for response to temperature and annealing, the degree of accuracy of the temperature measurement averaged over time can be ascertained.

A method of monitoring the object piece of equipment which utilizes apparatus in accordance with the monitor 2 includes the steps of mounting the above described passive detection means 10 and means 48 for determining said thermal history in close proximity to the object piece, exposing such mounted means to the environment of a normally operating nuclear power plant, and periodically analyzing the passive detection 10 and means 48 for determining said thermal history to determine whether the qualified life of the object piece may be extended.

Figure 4:
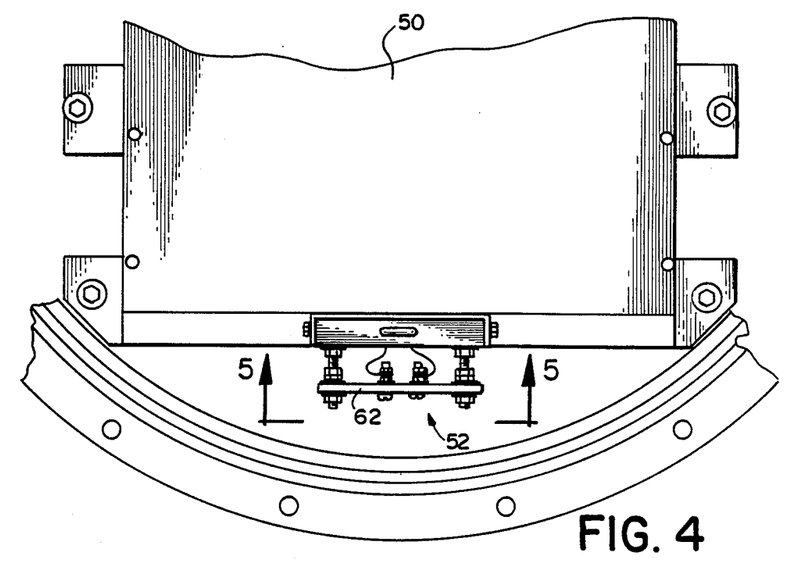
FIG. 4 illustrates a second embodiment of the of the monitor according to the present invention.
Figure 5:
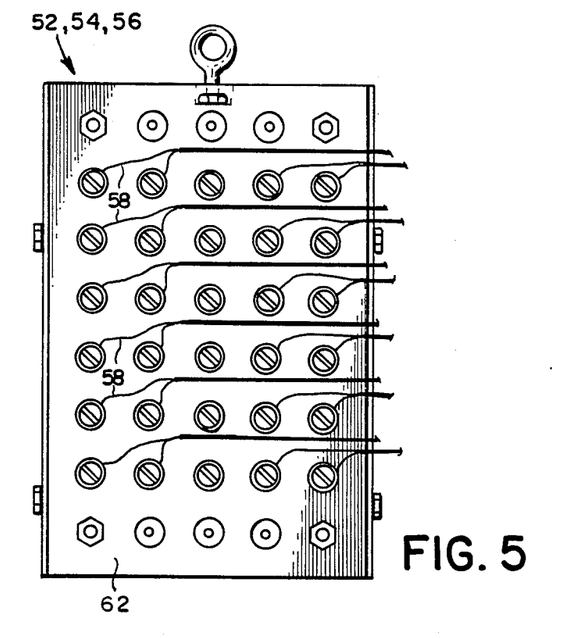
FIG. 5 is a detailed view of the monitor shown in FIG. 4 taken along the lines 5—5.

Referring now to FIGS. 4 and 5, a second embodiment of the present invention is shown. As illustrated in FIG. 4, a typical in core thermocouple reference junction box (RJB) 50 is monitored by a miniaturized RJB maintenance and surveillance test module 52. The module 52 is assembled to the same baseline design as the object equipment or RJB 50. After being thermally and radiation preaged to typically six years beyond the object piece of equipment, a documented baseline set of test data and parameters are obtained. The module 52 is then mounted in a representative environment of the its object piece of equipment, and allowed to continue natural aging during normal plant operation. Just before the object equipment artificially determined end of qualified life expires, the module is removed from its mounting and the baseline tests repeated. Should all tests be successfully completed, the object equipment qualified life would then be justified to be extended to its natural life plus that of the module preaging. The module is then reinstalled for another period equal to the preaged duration at which time the baseline tests are repeated increasing the object equipment qualified end of life another period equal to that of the preaging. Such sequence is repeated until any of the baseline tests fail, at which time, the object piece of equipment for RJB 50 is considered its end of life, thus requiring replacement.

In accordance with this second embodiment of the present invention, the passive detection means and means for determining said thermal history are accomplished through a miniature or representative sample of the object piece, the passive detection means comprising first mimic means 54 which is preaged through exposure to a selected amount of radiation thereby establishing a first predetermined baseline, and the means for determining said thermal history comprising second mimic means 56 preaged through exposure to a selected amount of heat thereby establishing a second predetermined baseline.

In a presently preferred embodiment of the module 52, the first mimic means 54 is preaged to an equivalent of six years exposure to normal radiation with an assumed dose approximating a loss of coolant accident, the total integrated dose comprising approximately 160 megarads gamma radiation. The second mimic means 56, on the other hand, is thermally aged to an equivalent of six years exposure at a service temperature of 120° F. by heating the module 52 for 107 hours at approximately 117° C. Thereafter, the preaged first and second mimic means 54, 56 of the module 52 is periodically visually inspected, as its insulation resistance measured, and is subjected to a compression/load test simulative of an earthquake to predict seismic failure. Temperature of the module 52 is monitored daily, as well as the radiation rate within the vicinity of the RJB 50, through means such as the aforedescribed TLD 14 (not shown in FIGS. 4 or 5). The insulation resistance readings are performed on the extension wires 58, while the compression/load test is conveniently performed through application of a 25 lb. force to the top board 62 of the module 52.

In accordance with this second embodiment of the present invention, a method of monitoring the object piece (i.e., the RJB 50) of equipment includes the performance of the previously described baseline tests prior to its installation next to the RJB 50, exposing the module 52 to the environment of the normally operating nuclear power plant, and periodically repeating the baseline tests to determine whether the qualified life of the object piece of equipment may be extended by comparing that qualified life to the installed life plus the number of years corresponding to the preaged life of the sample.

Obviously, many modifications are possible in light of the above teachings. It should, therefore, be understood that the present invention as defined by the appended claims may be practiced otherwise than as specifically described herein without departing from the true spirit or scope thereof.

I claim as my invention:

1. Apparatus for monitoring an object piece of qualified equipment in a nuclear power plant, said apparatus comprising:

passive means for detecting a total integrated dose of radiation received by the object piece, said passive detection means including first dosimetry means expose only to gamma rays for measuring a gamma ray dose and a second dosimetry means separate and distinct from said first dosimetry means, said second dosimetry means for measuring a beta ray dose;

means for determining a thermal history of the object piece, said determining means being separate and distinct from said first dosimetry means and said second dosimetry means; and means for housing said passive detection means and said means for determining said thermal history in close proximity to the object piece.

2. The apparatus according to claim 1, further comprising means for detecting neutron-induced fission.

3. The apparatus according to claim 2, wherein said fission detection means comprises at least one solid state track recorder (SSTR).

4. The apparatus according to claim 3, wherein said SSTR comprises:

a nickel backing disc;

a reusable deposit of a selected fissionable material on said backing disc; and replaceable mica in surface contact with said reusable deposit.

5. The apparatus according to claim 4, wherein said fissionable material is selected from the group of U-2325, U-238, Np-239 and Pu-239.

6. The apparatus according to claim 5, wherein said SSTR is cadmium-shielded.

7. The apparatus according to claim 5, wherein said fissionable material is selected from the group of U-235 and Pu-239.

8. The apparatus according to claim 7, wherein said SSTR is bare.

9. The apparatus according to claim 2, wherein said first dosimetry means comprises:
color-center formation means for measuring said gamma ray dose in a range of from approximately $10^3$ rads to $10^{10}$ rads;
thermoluminescent dosimetry means for measuring said gamma ray dose in a range of from 10 rads to approximately $10^5$ rads; and
means for holding said color-center formation means and said thermoluminescent dosimetry means within said housing means, said holding means being adapted to establish an electron equilibrium condition which satisfies requirements of Bragg-Gray small cavities.

10. The apparatus according to claim 9, wherein said color-center formation means comprises a plurality of lithium fluoride optical crystals.

11. The apparatus according to claim 9, wherein said thermoluminescent dosimetry means comprises at least one manganese-activated calcium fluoride thermoluminescent dosimeter.

12. The apparatus according to claim 9, wherein said holding means comprises:
a generally rectangular base portion having formed therein a longitudinal groove of a predetermined cross-section;
a slide portion having formed therein a plurality of slots adapted to contain said color-center formation means and said thermoluminescent dosimetry means, said slide portion having a cross-section complementary to said predetermined cross-section.

13. The apparatus according to claim 1, wherein second dosimetry means comprises:
a pair of lithium fluoride optical crystals; and
means for retaining said pair of optical crystals upon an exterior portion of said housing means.

14. The apparatus according to claim 13, wherein said retaining means comprises:
a cover plate having formed therein a groove to contain said pair of optical crystals;
means for protecting said pair of optical crystals from environmental hazards due to temperature and radiation, said protection means having a predetermined low mass thickness in order to minimize attenuation of beta rays; and
a retainer plate having formed therein a beta window comprised of a slot of dimensions corresponding generally to said groove formed in said cover plate, wherein said retainer plate is connected through said protection means to said cover plate in such a manner as to register said beta window with said groove containing said pair of optical crystals.

15. The apparatus according to claim 14, wherein said protection means comprises:

a polyimide film disk sealing said pair of optical crystals contained in said groove; and
a stainless steel foil disk retained between said film disk and said retainer plate;
wherein said predetermined low mass thickness of said film disk and said foil disk is less than thirty milligrams per square centimeter (30 mg/cm$^2$).

16. The apparatus according to claim 1, wherein said means for determining said thermal history comprises:
first monitor means for determining a peak temperature experienced by the object piece; and
second monitor means for determining an integrated thermal exposure to the object piece.

17. The apparatus according to claim 16, wherein said first monitor means comprises a non-reversible temperature label.

18. The apparatus according to claim 16, wherein said second monitor means comprises a plurality of solid state track recorders (SSTR), each said SSTR having been pre-exposed to a fission source to produce a predetermined number of fission fragment tracks which upon subsequent exposure to an elevated temperature are annealed at a rate corresponding to an Arrhenius function of temperature.

19. The apparatus according to claim 1, wherein said passive detection means includes beta radiation detection means and gamma radiation detection means, and said housing means comprises:
a tubular portion;
an end plate portion sealing said tubular portion at one end thereof, said end plate portion adapted to expose said beta radiation detection means to beta radiation; and
means for sealing said gamma radiation detection means and said means for determining said thermal history within said tubular portion, said tubular portion end plate portion and said flange portion being adapted to provide a thermal inertia for reducing monitor sensitivity to brief excursions of temperature which would not affect the object piece, to provide a beta radiation shielding for said gamma radiation detection means, and to provide protection from an accident environment.

20. A method of monitoring an object piece of qualified equipment in a nuclear power plant, comprising the steps of:
providing passive means for detecting a total integrated dose of radiation received by the object piece, said passive detection means including first dosimetry means exposed only to gamma rays for measuring a gamma ray dose and a second dosimetry means separate and distinct from said first dosimetry means, said second dosimetry means for measuring a beta ray dose;
providing a means for determining a thermal history of the object piece, said determining means being separate and distinct from said first dosimetry means and said second dosimetry means; and
housing said passive detection means and said means for determining said thermal history in close proximity to the object piece.

21. The method according to claim 20 wherein said first providing step comprises the steps of:
measuring a gamma ray dose with said first dosimetry means, said first dosimetry means including color-center formation means for measuring said gamma ray dose in a first predetermined range, thermoluminescent dosimetry means for measuring said gamma ray dose in a second predetermined range, and means for holding said color-center formation means and said thermoluminescent dosimetry means within said housing means, said holding means being adapted to establish an electron equilibrium condition which satisfies requirements of Bragg-Gray small cavities; and measuring a beta ray dose with said second dosimetry means, said second dosimetry means including a pair of lithium fluoride optical crystals and means for retaining said pair of optical crystals upon an exterior portion of said housing means.

22. The method according to claim 21, wherein said first predetermined range comprises from $10^3$ rads to $10^{10}$ rads, and said second predetermined range comprises from 10 rads to $10^5$ rads.

23. The method according to claim 20, further comprising the step of detecting neutron-induced fission with at least one solid state track recorder.

24. The method according to claim 20, wherein said second providing step comprises:

determining a peak temperature experienced by the object piece with first monitor means including at least one non-reversible temperature label; and determining an integrated thermal exposure to the object piece with second monitor means including a plurality of solid state track recorders (SSTR).

25. The method according to claim 24, wherein said second determining step further comprises pre-exposing said SSTRs to a fission source to produce a predetermined number of fission fragment tracks which upon subsequent exposure to an elevated temperature are annealed at a rate corresponding to an Arrhenius function of temperature.

26. In a nuclear power plant having an object piece of qualified equipment exposed to gamma and beta radiation, as well as thermal transients from a service temperature, apparatus for monitoring the object piece to project its ability for extensions of its qualified life, comprising:

passive means for detecting a total integrated dose of radiation received by the object piece, said passive detection means comprising first dosimetry means exposed only to gamma rays for measuring a gamma ray dose, and, a second dosimetry means separate and distinct from said first dosimetry means, said second dosimetry means for measuring a beta ray dose;

means for determining a thermal history of the object piece comprising first monitor means for determining a peak temperature experienced by the object piece and second monitor means for determining an integrated thermal exposure to the object piece, said determining means being separate and distinct from said first dosimetry means and said second dosimetry means; and means for housing said passive detection means and said means for determining said thermal history in close proximity to the object piece.

* * * * *